(12) United States Patent
Broberg

(10) Patent No.: US 9,100,638 B2
(45) Date of Patent: Aug. 4, 2015

(54) SIGNAL IDENTIFICATION FOR DOWNSTREAM PROCESSING

(75) Inventor: David K. Broberg, Lafayette, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 510 days.

(21) Appl. No.: 13/344,112

(22) Filed: Jan. 5, 2012

(65) Prior Publication Data

US 2013/0176297 A1 Jul. 11, 2013

Related U.S. Application Data

(60) Provisional application No. 61/583,271, filed on Jan. 5, 2012.

(51) Int. Cl.
H04N 13/00 (2006.01)
H04N 21/4402 (2011.01)
H04N 21/81 (2011.01)
H04N 21/61 (2011.01)

(52) U.S. Cl.
CPC ....... *H04N 13/0059* (2013.01); *H04N 13/0029* (2013.01); *H04N 13/0066* (2013.01); *H04N 21/440218* (2013.01); *H04N 21/816* (2013.01); *H04N 21/6143* (2013.01); *H04N 2213/007* (2013.01)

(58) Field of Classification Search
CPC .......... H04N 13/0059; H04N 13/0066; H04N 13/0029; H04N 13/6143; G06T 19/00; G06T 2207/10012; G06T 3/0093
USPC ........................................................ 345/660
See application file for complete search history.

(56) References Cited

U.S. PATENT DOCUMENTS

| | | | | |
|---|---|---|---|---|
| 6,535,688 | B1* | 3/2003 | Kawamura et al. | 386/240 |
| 2011/0043614 | A1* | 2/2011 | Kitazato | 348/51 |
| 2011/0157155 | A1* | 6/2011 | Turner et al. | 345/419 |
| 2011/0200302 | A1* | 8/2011 | Hattori et al. | 386/246 |
| 2011/0228057 | A1* | 9/2011 | Kobayashi | 348/51 |
| 2012/0229600 | A1* | 9/2012 | Zhang et al. | 348/43 |
| 2013/0088573 | A1* | 4/2013 | Collar et al. | 348/46 |

* cited by examiner

*Primary Examiner* — Jason M Repko
*Assistant Examiner* — Kwang Lee
(74) *Attorney, Agent, or Firm* — Great Lakes Intellectual Property, PLLC

(57) ABSTRACT

A signal identification process as contemplated to facilitate output of signaling based at least in part on metadata transmitted with the signaling. The contemplated processing may include facilitating output of the content according to one of a plurality of output modes depending on the metadata specifying values for a dynamic floating window (DFW) field and a 2K format conversion preference field.

17 Claims, 3 Drawing Sheets

SIGNAL IDENTIFICATION FOR DOWNSTREAM PROCESSING

CROSS-REFERENCE TO RELATED APPLICATIONS

This application claims the benefit of U.S. provisional Application No. 61/583,271 filed Jan. 5, 2012, the disclosure of which is incorporated in its entirety by reference herein.

TECHNICAL FIELD

The present invention relates to the processing of signaling, such as but not limited to processing 3D signaling to facilitate accurately conveying artist intent for 3D content display.

BACKGROUND

Horizontal image translation (HIT) is an electronic process for shifting the left-eye and right-eye images horizontally as a way to alter the stereoscopic characteristics and alignment of 3D content after signals have been captured by stereoscopic cameras. When used cautiously and with full awareness of the impact on other interrelated aspects of the stereography, HIT may be used as a valuable tool in the post production process as a means to modify stereoscopic content for more comfortable viewing. HIT, for example, may be used to alter the zero parallax setting (ZPS), to compensate for stereo window violations or to compensate for excessive positive or negative parallax in the source material.

There are at least three related variables that the stereographer is continuously trying to control when shooting for a given screen size and a given viewing distance. The stereographer must use (1) the focal length of the camera lens, (2) the distance from camera-to-subject, (3) the distance between the lenses and sometimes (4) the toe-in or convergence angle of the cameras to calibrate the stereo presentation for a single screen size and viewing distance. When HIT is used downstream in the post-production process, there is a risk of unintended consequences to the chosen balance of these interrelated parameters determined by the stereographer or artist during the original production.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
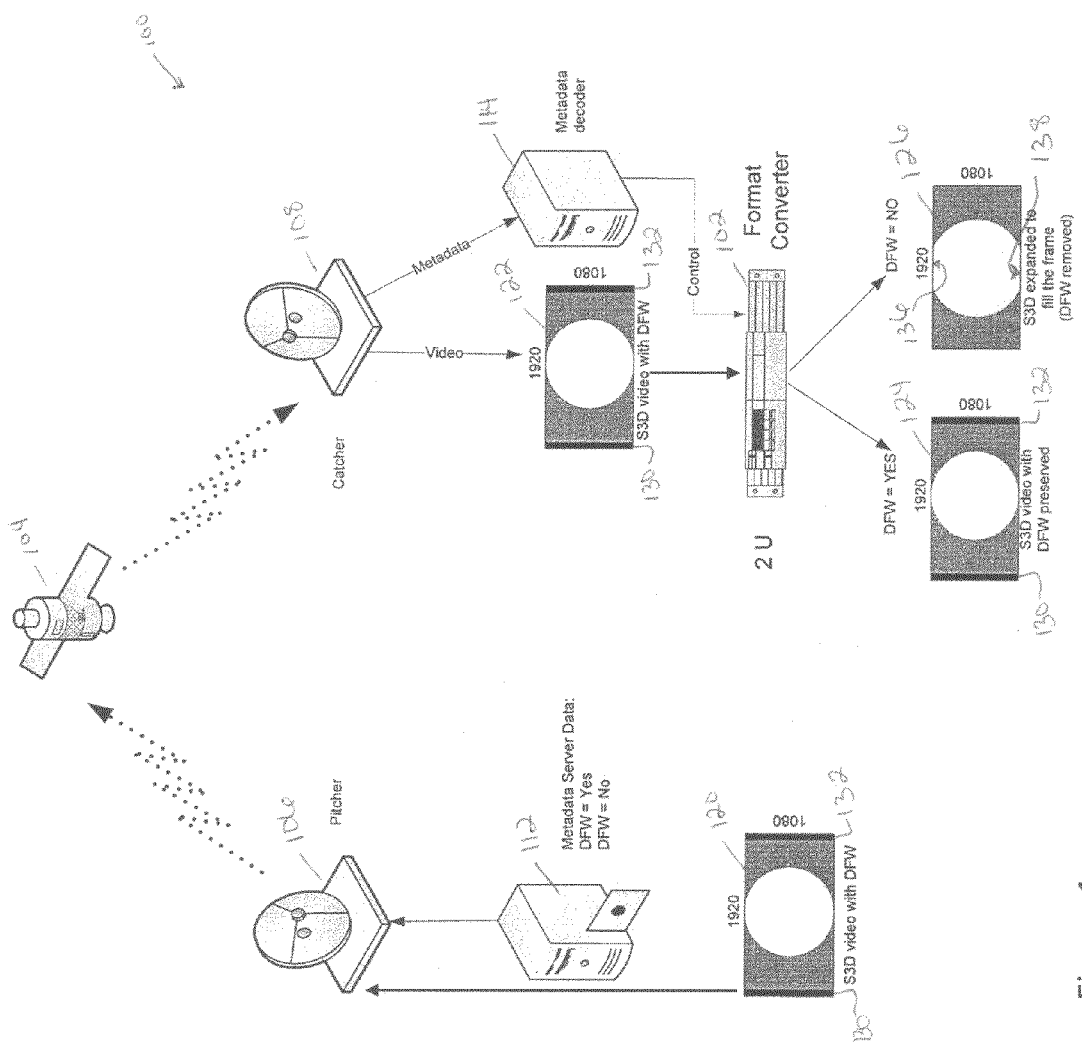
FIGS. 1-2 illustrates processing systems as contemplated by non-limiting aspects of the present invention.

FIG. 1 illustrates a processing system 100 as contemplated by one non-limiting aspect of the present invention. The system 100 may be configured to facilitate processing signals, such as but not limited to signals associated with facilitating transmission of 3D content for display or other output to a user. The system 100 is predominately described with respect to the 3D content relating to television programming of the type where a plurality of video frames are transmitted to a format converter 102 to facilitate processing and output to the user. This is done for exemplary non-limiting purposes as the present invention fully contemplates its use and application in facilitating signal processing of the type used to transmit other forms of content, including non-television related content and non-3D related content. Optionally, use of the format converter 102 may be omitted and/or incorporated within an output device (not shown) or other feature configured to facilitate interfacing the content with user.

The system 100 is also illustrated for exemplary, non-limiting purposes to rely on a satellite 104 to facilitate transmission of the signaling from a sourcing entity 106 to a receiving entity 108. The present invention fully contemplates the use of any sufficiently operable wireless and/or wireline network and/or medium to facilitate transmission of the signaling between the sourcing entity 106 and the receiving entity 106, including the use of discs or other transportable storage mediums. The configuration of the sourcing entity 106 and the receiving entity 108 may vary depending on the medium used to facilitate the signaling and/or output device. The sourcing entity 106 may be a studio or other original source of content. The receiving entity 108 maybe a headend in the event the receiving entity is associated with a cable, satellite, or broadcast television provider and a cellular tower in the event the receiving entity is associated with a cellular communications provider.

The output device may be a mobile phone, a television, a computer, or any other electronically operable device sufficiently configured to facilitate output of the content to a user. The output device may be separate from the format converter 102, as shown, and/or integrated therewith, such as in the case of being configured as a television having an embedded set top box (STB). The configuration and output capabilities of the output device may directly influence whether the 3D content can be properly output to the user according to the original intention of the content provider, e.g., without edge violation being induced due to viewing on a smaller screen than originally intended. The ability to preserve the original presentation intent of the content provider may be particularly relevant to ensuring a desirable 3D experience.

A metadata server 112 may be associated with the sourcing entity 106. The metadata server 112 may be configured to attach, embed, or otherwise associate metadata with the signaling. The metadata server 112, for example, may be configured to identify different programs and/or pieces of content being carried within the signaling and to assign corresponding metadata to the content. The metadata may travel with the signaling, as shown, and/or, it may be separately transmitted, such as over the Internet through IP communications between the metadata server 112 and a metadata decoder 114. The metadata decoder 114 may be associated with the receiving entity 108 and configured to facilitate interfacing the received metadata with the format converter 102. Optionally, the metadata decoder 114 may facilitate interfacing the received metadata with a plurality of format converters (not shown). The metadata decoder 114 may be in communication with the format converter 102 and/or output device to facilitate identifying the metadata associated with the content currently desired by the user.

FIG. 1 illustrates an application of the present invention where the sourcing entity 106 is configured to source 3D content comprising a plurality of video frames having a 1920.times.1080 format. An exemplary one of the video frames is shown and described as it is transmitted and processed throughout the system as a first video frame 120, a second video frame 122, a third video frame 124, and a fourth video frame 126. The illustrated video frame is exemplary of a single video frame being transmitted through the system in accordance with the present invention, which optionally may be the same regardless of whether the video frame corresponds with a left or right eye video frame. The first video frame 120 is shown to include a black bar/mask 130, 132 at each of a left hand side and a right hand side. These black bars 130, 132 may be referred to as dynamic floating windows (DFWs). The DFWs may be included to eliminate edge violations and/or other convergence problems associated with facilitating output of the 3D content at the output device in the event output device is configured differently from an original output device intended for the 3D content.

The sourcing entity 106 may be configured to facilitate transmission of the metadata associated with a program or other content grouping associated with the signaling. The illustrated transmission is described with respect to the one video frame, however, the description is intended to encompass the corresponding transmission of the other video frames comprising the program of and the related metadata. The sourcing entity 106 may be configured to transmit the first video frame to the satellite 104 or other device to facilitate transmission to the receiving entity 108. The receiving entity 108 may be configured to receive the first video frame 120 and to output it as a second video frame 122 and separately from the corresponding metadata. The second video frame 122 and the corresponding metadata may be received by the format converter 102 for processing prior to output to the user. Of course, the present invention is not necessarily limited to this configuration and fully contemplates the receiving entity commonly transmitting the second video frame 122 and the metadata to the format converter 102 and/or the metadata decoder 114.

The format converter 102 may be configured in accordance with the present invention to facilitate output of the second video frame 122 as the third video frame 124 or the fourth video frame 126 depending on the metadata associated therewith. The third video frame corresponds with the format converter 102 facilitating output of the second video frame 122 according to a preservation mode. The fourth video frame 126 corresponds with the format converter 102 facilitating output of the second video frame 102 according to an expansion mode.

The preservation mode may correspond with the format converter 102 facilitating output of the third video frame 124 without scaling or otherwise adjusting the formatting of the second video frame 122. The preservation mode may result in the output of the third video frame 124 displaying one or both of the black bars 130, 132 included on the left and right hand side or other masking features included within the originally transmitted first video frame. The output of the masking bars may be beneficial in maintaining original artist intent for display of the corresponding content, i.e., the black bars 130, 132 added post production may be used to prevent edge violations. The ability of the present invention to implement the preservation mode may be beneficial in allowing an artist or other sourcing entity to preserve formatting of the first video 120 frame as originally transmitted when finally output to the user. This capability can be helpful in preventing certain downstream processes from inadvertently or intentionally manipulating the original formatting first video frame prior to output has the third video frame 124.

One downstream manipulation of the first video frame 120 may correspond with the format converter 102 facilitating output of the fourth video frame 126 according to the expansion mode. The expansion mode may result in the format converter 102 facilitating output of the fourth video frame 124 to the user without the corresponding black bars 130, 132 included within the third video frame 124. The format converter 102 may be configured to implement the expansion mode by increasing a scale of the first video frame 120 to cover the black bar portions 130, 132. As illustrated, the expansion mode corresponds with the format converter increasing the first video frame 120 in scale by 4.35%, resulting in an upper and lower portion 136, 138 of the forth video frame 126 being clipped in order to remove the bars. While the expansion mode is shown to correspond with both of a height and width of the first video frame being expanded, other expansion techniques and/or other processing sufficient to remove the masking 130, 132 included within the first video frame 120 may be used without deviating from the scope in contemplation of the present invention.

The format converter 102 may be configured to facilitate implementing the preservation mode and the expansion mode based on information included with the corresponding metadata. The metadata may include a plurality of data fields that may be relied upon to facilitate choosing between the preservation mode and the expansion mode. The plurality of data fields may be chosen to correspond with the values, fields and data associated with 3D Home Master Metadata (WD SMPTE STANDARD) SMPTE 2061-3:2011, the disclosure of which is hereby incorporated by reference in its entirety. In the event the same content stream (e.g., television program) desires to utilize both of the preservation mode and the expansion mode, the values included within the various metadata fields may be changed during transmission/output of the corresponding plurality of video frames during which the various modes are desired. The metadata decoder 114 and/or the format converter 102 may be configured to process the metadata in a manner sufficient to facilitate the desired implementation of the convention mode and/or preservation mode.

When the downstream distribution will be providing 3D content to smaller screens than originally optimized for, it is often helpful to use a process of horizontal image translation (HIT) to alter the zero parallax setting. When this process is applied to 1920×1080 masters, there is some loss at the edges of the screen which are cropped in the adjustment process, leaving asymmetric black bars on the edges. These bars can be distracting and are best removed through some rescaling of the image which results in losses at the top and bottom of the image. When the 3D content is provided in the home master in the 2K format, there is an additional 128 pixels of image width now available for this HIT processing. If the content was produced with this in mind, the +/−64 pixels will be available for this downstream adjustment and cropping without the need for any rescaling.

Figure 2:
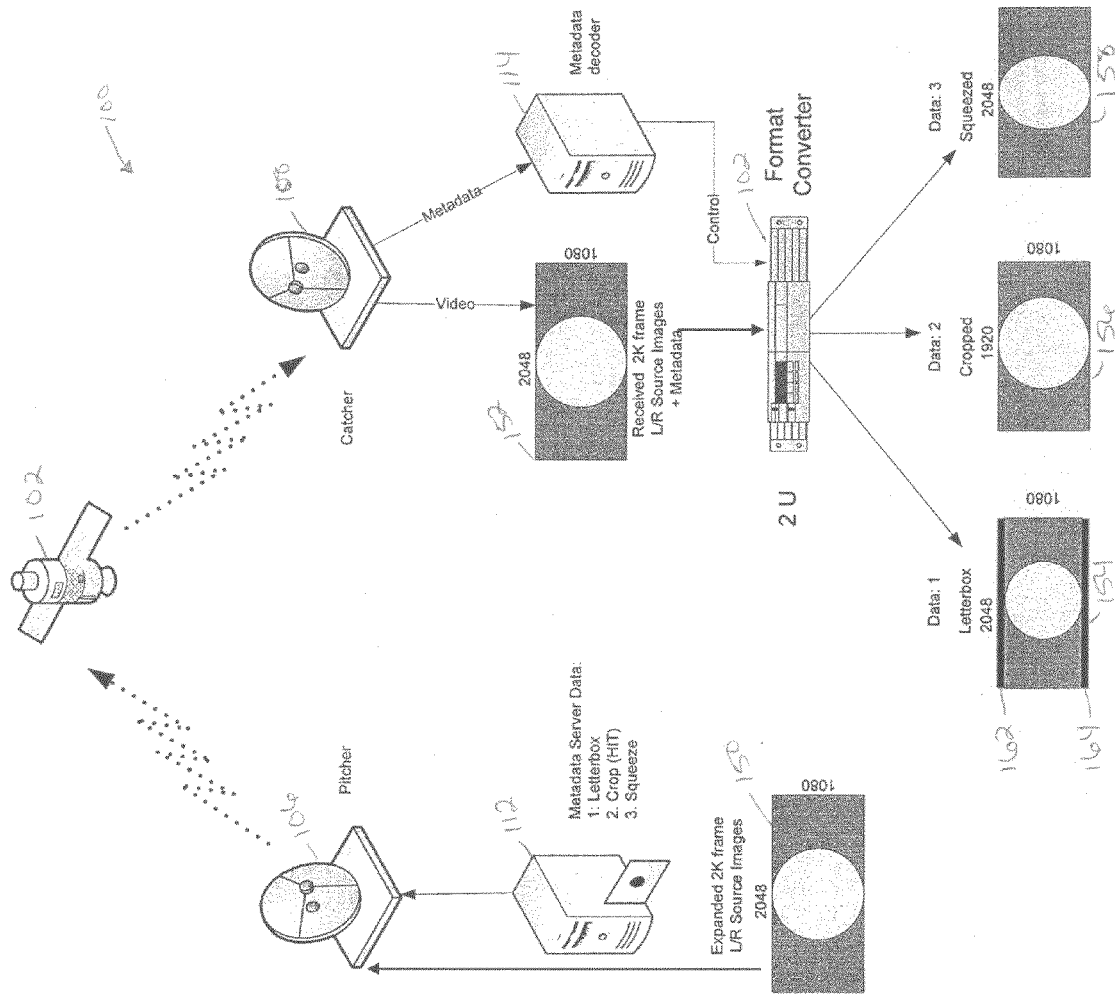

FIG. 2 illustrates an application the present invention where the sourcing entity 106 is configured to source 3D content comprising a plurality of video frames having a 2048×1080 format, such as but not necessarily limited that associated with the cinematic 2K video format. As with the description associated with FIG. 1, the application of FIG. 2 describes a single video frame having an original format, and being referred to as a first video frame 150, as it is transmitted and processed throughout the system into a second 152, third 154, fourth 156, and fifth 158 video frame. This description is likewise intended to convey transmission of a plurality of video frames and the processing that the video frames would undergo within the system 102. The description with respect to a single video frame is provided for exemplary purposes as similar processing would be associated with the plurality of video frames. The first video frame 150 shown in FIG. 2 deviates from the first video frame 120 shown in FIG. 1 as it is formatted to have includes a larger width (e.g., 2048 pixels).

The transmission processing of the wider first video frame 150 through the system 100 may be similar to that described above with respect to FIG. 1, at least with respect to output of the second video frame 152 corresponding with the same formatting of the first video frame 150 and the format converter 102 receiving the second video frame 152 and metadata. The format converter 102 may be configured to process the metadata to facilitate output of the second video frame 152 according to one of a letterbox mode, a cropped mode, and a squeezed mode. The third video frame 154 may correspond with output according to the letterbox mode, the fourth video frame 156 we correspond with output according to the cropped mode, and the fifth video frame 158 may correspond with output according to the squeezed mode. The process by which the format converter 102 identifies the appropriate output modes may occur in a manner similar to that described above with respect to FIG. 1 in that values or other parameters of one or more data types included with the metadata may be inspected to determine the desired output mode.

The letterbox mode may be configured to facilitate the entire frame width being preserved and the entire image being reduced by a factor of 0.9375, which results in black bars 162, 164 (letterboxing) at the top and bottom of the image. The squeezed mode may be configured to facilitate the full frame height being preserved and only the width of the image being anamorphically reduced by a factor of 0.9375 to fill the 16×9 frame such that no change is made to the height of the frame. The cropped mode may be configured to facilitate the height and width remaining unscaled, but the 128 pixels (64 pixels on each side) that extend beyond the width of a 16×9 frame being removed from the image. While not illustrated, the format converter 102 may also be configured to implement the above-describe preservation mode so that the first video frame 150 may be output according to its original transmission form in the event a suitable output device is being used.

Figure 3:
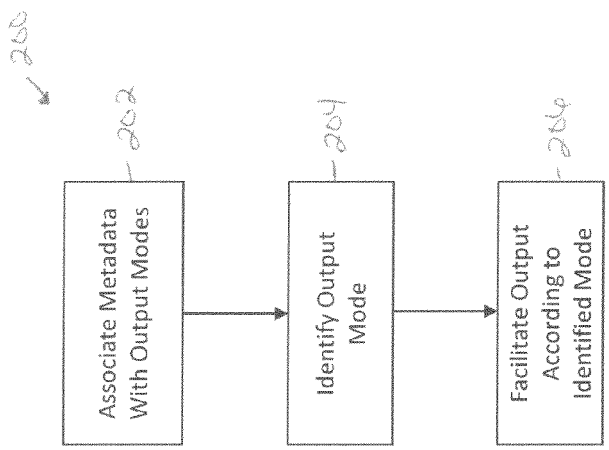
FIG. 3 illustrates a flowchart of a method of signal identification for downstream processing as contemplated by one non-limiting aspect of the present invention.

FIG. 3 illustrates a flowchart 200 of a method of signal identification for downstream processing as contemplated by one non-limiting aspect of the present invention. The method may relate to facilitating processing of signaling in a manner intended to maintain, at least as best as possible, original artistic intent of the content. This may include processing 3D content and/or non-3D content so as to prevent downstream devices from inappropriately facilitating output of the signaling. The method may be embodied in a computer-readable medium operable within a processor other element associated with one or more of the devices described above, such as but not limited to a computer application/software or logically executing feature operable with the format converter 102 to facilitate processing and output of the signal as contemplated herein. The method is described for exemplary non-limiting purposes with respect to facilitating processing of 3D signaling, however, the present invention fully contemplates facilitating signal processing with non-3D signaling.

Block 202 relates to associating metadata with various output modes. This may include associating metadata values and or other parameters with one or more of the above-described preservation mode, expansion mode, letterbox mode, cropped mode, and squeezed mode. This may be done prior to and/or after deploying the format converter 102 into the field. Optionally, the association of the metadata with output modes may include further associations, such as but not limited to additional associations specific to the formatting of the corresponding signaling. This additional association may include limiting or preventing use of certain ones of the output modes depending on the originally intended formatting of the signaling, i.e., certain output modes may be associated with 1920×1080 video frames and a different one or more of the output modes may be associated with 2048× 1080 video frames.

Block 204 relates to identifying the one or more of output modes to be used when facilitating output of the 3D content. The description herein is provided with respect to implementing a single output mode, however, as noted above, multiple output modes may be implemented if there are portions of the signaling desired for output according to a different one of the output modes. Identification of the desired output modes may be performed with a format converter and/or, the format converter may be programmed with an application or other features sufficient to facilitate interpreting metadata in a manner sufficient to identify the desired output mode, i.e., the desired one or more of the preservation mode, expansion mode, letterbox mode, cropped mode, and squeezed mode. Of course, the present invention is not necessarily limited to identify these particular output modes and fully contemplates identifying and facilitating use of any number of other output modes.

Block 206 relates to the format converter processing the corresponding plurality of video frames in a manner sufficient to facilitate their output, i.e., a manner sufficient to displaying moving images and/or sound within a television display, computer, tablet, mobile phone, etc. Alternatively, the format converter may be configured to facilitate instructing other devices to implement the corresponding processing and/or control of the output device to achieve the desired output mode. In the event the format converter is omitted and/or used to manage output for a plurality of output devices, the identification of the proper output mode and the timing of when to change between output modes may be coordinated so that the format converter may be used to simultaneously control and direct operations of a plurality of output devices.

As supported above, one non-limiting aspect of the present invention contemplates a system for identification and processing of stereoscopic 3D content for accurate downstream processing.

Standards for metadata may be developed in accordance with the present invention to convey important information about stereoscopic 3D content, including a standard containing coding parameters such as maximum disparity, 3d conversion types, intended screen size, etc.

This invention extends the value of metadata associated with facilitating 3D and other types of content signaling transmissions by the optional inclusion of two data types which provide specific benefits for downstream conversion processors. The data types may include:

1. A metadata field designed to identify Dynamic Floating Windows (DFW), which are a type of video process applied to 3D content to minimize the impact of certain 3D viewing challenges including edge violations and cross-talk (ghosting). When DFWs are applied to 3D content, the results are usually the creation of a blank bar (usually black) on the left and right edges of the 3D video frame. A tag is proposed that enumerates the presence of DFW in the source material. This DFW tag (which may be the Boolean indication of DFW or not), when received by downstream encoders, format converters and scalers would prevent them from erroneously detecting the black bars on the side of the screen as side panels and falsely indicating the Active Format Descriptor (AFD) method of describing a non-standard aspect ratio.

2. A metadata field to identify the preferred scaling method when the 2K (2048 pixels wide) video format may be used as the 3D Home Master format. This field may be used to signal the intended scaling/processing method for downstream format converters that are necessarily used to convert 2K video into a broadcast standard 16:9 aspect ratio using 1920.times.1080 pixels or 1280.times.720 pixels. The metadata tag is may enumerate one of three processing methods: (a) Letterbox; (b) Crop (or Horizontal Image Translation); and (c) Squeeze. This indication is necessary to preserve the producer's intent since the 2K format has a slightly wider aspect ratio than what can be broadcast using standardized video formats. Downstream processors, scalers or reformatters will read this metadata and apply the appropriate processing algorithm. The table below illustrates an exemplary description of contemplated data types.

| Element Name | Description | Enumeration | Applicability |
|---|---|---|---|
| 2K Format Conversion Preference | Indicates the preferred sealer processing type for downstream conversion to standardized 16:9 transmission formats (1920 × 1080 or 1280 × 720) | Letterboxed Crop (HIT) Squeeze | Global Sequence of edit units |
| Dynamic Floating Windows | Indicates the presence of dynamic floating windows in the content, to avoid misidentification as side-panels. | Boolean | Global Sequence of edit units |

One non-limiting aspect of the present invention contemplates enabling the artist's intent for stereoscopic 3D content to be more accurately conveyed as part of the content and enables the effective downstream processing necessary to avoid distortion of the signals.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of processing 3D signaling for output as 3D content, the 3D signaling including a plurality of left-eye and right-eye images, the method comprising:
determining horizontal image translation (HIT) performed on the 3D signaling prior to being transmitted as HIT-formatted 3D signaling to a device for output, including determining a dynamic floating window (DFW) added to each of at least one of the left-eye and right-eye images;
associating metadata with the HIT-formatted 3D signaling according to the HIT performed, the metadata sufficient for use with the device to facilitate automatically processing the HIT-formatted 3D signaling for output, the metadata including a DFW field set to:
i) a first value when identifying the HIT-formatted 3D signaling for output according to a preservation mode; and
ii) a second value when identifying the HIT-formatted 3D signaling for output according to an expansion mode;
determining the HIT to be in a symmetrical manner to produce the HIT-formatted 3D signaling, the symmetrical manner including:
i) shifting of each left-eye image in a first direction by a first amount of pixels such that a first portion of each left-eye image is cropped;
ii) shifting of each right-eye image in a second direction opposite to the first direction by the first amount of pixels such that a second portion of each right-eye image is cropped;
iii) adding of the DFW to a third portion of each left-eye image, the third portion being opposite to the first portion, the DFW replacing corresponding pixels of each left-eye image with black bars; and
iv) adding of the DFW to a fourth portion of each right-eye image, the fourth portion being opposite to the second portion, the DFW replacing corresponding pixels of each right-eye image with black bars.

2. The method of claim 1 further comprising including a 2K format conversion preference field as part of the metadata and setting the 2K format conversion preference field to:
a third value when identifying the HIT-formatted 3D signaling for output according to a letterbox mode;
a fourth value when identifying the HIT-formatted 3D signaling for output according to a cropped mode; and
a fifth value when identifying the HIT-formatted 3D signaling for output according to a squeezed mode.

3. The method of claim 2 further comprising identifying the letterbox mode such that the device reduces one of a width and a height of each left-eye and right-eye image in scale when output.

4. The method of claim 2 further comprising identifying the cropped mode such that the device crops a cropped portion of no more than one of a width and a height of each left-eye and right-eye image, the cropped portion thereby being removed when output, including cropping the cropped portion without adjusting a scale of either the left-eye or right-eye images as transmitted to the device.

5. The method of claim 2 further comprising identifying the squeezed mode such that the device reduces in scale a width, and not a height, of each left-eye and right-eye image when output.

6. The method of claim 1 further comprising identifying the preservation mode such that the left-eye and right-eye images of the HIT-formatted 3D signaling are unscaled when output, thereby displaying each DFW.

7. The method of claim 1 further comprising identifying the expansion mode such that the device expands at least one of a width and a height of each left-eye and right-eye image of the HIT-formatted 3D signaling when output, thereby lowering resolution of the left-eye and right-eye images after transmission of the HIT-formatted 3D signaling to the device.

8. A method of processing 3D signaling having left-eye and right-eye images comprising:
performing horizontal image translation (HIT) on the 3D signaling to generate HIT-formatted 3D signaling, the HIT cropping each of at least one of the left-eye and right-eye images;
transmitting the HIT-formatted 3D signaling to a device;
associating metadata with the HIT-formatted 3D signaling, the metadata sufficient for use by the device in processing the HIT-formatted 3D signaling for output, the metadata:
i) identifying the HIT-formatted 3D signaling for output according to a preservation mode when set to a first value;
ii) identifying the HIT-formatted 3D signaling for output according to an expansion mode when set to a second value; and performing the HIT in a symmetrical manner to produce the HIT-formatted 3D signaling, including:
i) cropping the left-eye images by shifting each left-eye image in a first direction such that a first portion of each left-eye image is cropped;
ii) cropping the right-eye images by shifting each right-eye image in a second direction opposite to the first direction such that a second portion of each right-eye image is cropped;
iii) adding a dynamic floating window (DFW) to a third portion of each left-eye image, the third portion being opposite to the first portion, the DFW replacing corresponding pixels of each left-eye image with black bars; and
iv) adding the DFW to a fourth portion of each right-eye image, the fourth portion being opposite to the second portion, the DFW replacing corresponding pixels of each right-eye image with black bars.

9. The method of claim 8 further comprising the metadata:
identifying the HIT-formatted 3D signaling for output according to a letterbox mode when set to a third value;
identifying the HIT-formatted 3D signaling for output according to a cropped mode when set to a fourth value;
identifying the HIT-formatted 3D signaling for output according to a squeezed mode when set to a fifth value.

10. The method of claim 9 further comprising the metadata:
identifying the expansion mode such that the device expands at least one of a width and a height of the left-eye and right eye images included in the HIT-formatted 3D signaling, thereby lowering resolution of the left-eye and right-eye images when output from the device;
identifying the squeezed mode such that the device reduces in scale a width, and not a height, of the left-eye and right eye images included in the HIT-formatted 3D signaling when output;
identifying the letterbox mode such that the device reduces in scale a width and a height of the left-eye and right eye images included in the HIT-formatted 3D signaling when output;
identifying the preservation mode such that the device processes the HIT-formatted signaling for output without cropping or scaling the left-eye and right-eye images; and
identifying the cropped mode such that the device crops each of at least one of the left-eye and right-eye images included in the HIT-formatted signaling when output.

11. A non-transitory computer-readable medium including a plurality of non-transitory instructions operable with a format converter to facilitate processing of 3D signaling for output as 3D content, the 3D signaling including left-eye and right-eye images, the left-eye and right-eye images being generated from horizontal image translation (HIT) performed on master left-eye and right-eye images, the HIT generating the left-eye and right-eye images by (i) shifting each master left-eye image in a first direction by a first amount of pixels such that a first portion of each master left-eye image is cropped; (ii) shifting each master right-eye image in a second direction opposite to the first direction by the first amount of pixels such that a second portion of each master right-eye image is cropped; (iii) adding a dynamic floating window (DFW) to a third portion of each master left-eye image where the third portion is opposite to the first portion and the DFW replaces corresponding pixels of each master left-eye image with black bars; and (iv) adding the DFW to a fourth portion of each master right-eye image where the fourth portion is opposite to the second portion and the DFW replaces corresponding pixels of each right-eye image with black bars, the non-transitory instructions being sufficient for:
detecting a format conversion preference field included within the 3D signaling;
converting the left-eye and right-eye images of the 3D signaling prior to output from the format converter as converted left-eye and right-eye images, including converting the left-eye and right-eye images according to metadata included in the format conversion preference field such that the converted left-eye and right-eye images when output from the converter are at least one of a scaled and a cropped version of the left-eye and right-eye images transmitted to the format converter; and
converting the left-eye and right-eye images according to an expansion mode indicated in the metadata, the expansion mode adjusting for the HIT by equally increasing scaling of each pixel in the left-eye and right-eye images such that each DFW and portions of each left-eye and right-eye image orthogonal to each DFW are cropped, resulting in a lowering of a resolution of the left-eye and right-eye images when output from the format converter as the converted left-eye and right-eye images.

12. The method of claim 7 further comprising identifying the expansion mode such that the device expands the left-eye and right-eye images an amount sufficient to prevent display of each DFW included in the HIT-formatted 3D signaling.

13. The method of claim 7 further comprising identifying the expansion mode such that the device equally expands the width and the height of each left-eye and right-eye image by an amount sufficient to crop opposed sides of each left-eye and right-eye images.

14. A method of processing 3D signaling for output as 3D content, the 3D signaling including a plurality of left-eye and right-eye images, the method comprising:
determining horizontal image translation (HIT) performed on the 3D signaling prior to being transmitted as HIT-formatted 3D signaling to a device for output, including determining a dynamic floating window (DFW) added to each of at least one of the left-eye and right-eye images;
associating metadata with the HIT-formatted 3D signaling according to the HIT performed, the metadata sufficient for use with the device to facilitate automatically processing the HIT-formatted 3D signaling for output, the metadata including a DFW field set to:
i) a first value when identifying the HIT-formatted 3D signaling for output according to a preservation mode; and
ii) a second value when identifying the HIT-formatted 3D signaling for output according to an expansion mode;
determining the HIT to be in an asymmetrical manner to produce the HIT-formatted 3D signaling, the asymmetrical manner including:
i) shifting of only one of each left-eye image and each right-eye image in a first direction by a first amount of pixels such that a first portion of each corresponding image is cropped;
ii) adding of the DFW to a second portion of each left-eye image, the second portion being opposite to the first portion, the DFW replacing corresponding pixels of each left-eye image with black bars; and
iii) adding of the DFW to a third portion of each right-eye image, the third portion being opposite to the second portion, the DFW replacing corresponding pixels of each right-eye image with black bars.

15. The method of claim 8 further comprising the metadata:
- identifying the expansion mode such that the device expands each of the left-eye and right-eye images included in the HIT-formatted 3D signaling to remove each DFW from the left-eye and right-eye images when output; and
- identifying the preservation mode such that the device removes each DFW within the left-eye and right-eye images when output.

16. The method of claim 15 further comprising the metadata identifying the expansion mode such that the device expands each pixel of the left-eye and right-eye images by an equal amount sufficient to remove each DFW and crop portions of the left-eye and right-images orthogonal to each DFW.

17. The non-transitory computer-readable medium of claim 11 further comprising non-transitory instructions sufficient for:

- converting the left-eye and right-eye images according to a squeezed mode when indicated in the metadata, the squeezed mode reducing in scale a width, and not a height, of the left-eye and right eye images prior to output as the converted left-eye and right-eye images;
- converting the left-eye and right-eye images according to a letterbox mode when indicated in the metadata, the letterbox mode reducing in scale a width and a height of the left-eye and right eye images prior to output as the converted left-eye and right-eye images;
- converting the left-eye and right-eye images according to a cropped mode when indicated in the metadata, the cropped mode cropping each of at least one of the left-eye and right-eye images prior to output as the converted left-eye and right-eye images.

* * * * *